Nov. 19, 1940.  H. F. ROBERTSON  2,222,490
PLASTIC COMPOSITION
Filed Dec. 29, 1937
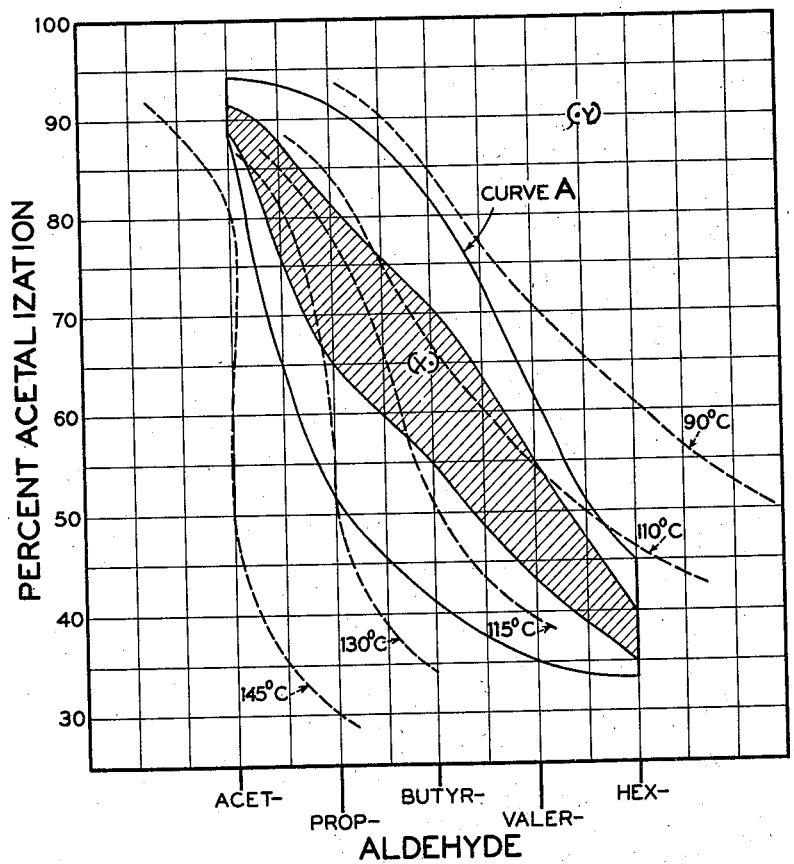
INVENTOR
HAROLD F. ROBERTSON
BY
ATTORNEY Patented Nov. 19, 1940

2,222,490

UNITED STATES PATENT OFFICE 2,222,490

PLASTIC COMPOSITION

Harold F. Robertson, Coraopolis, Pa., assignor to Carbide and Carbon Chemicals Corporation, a corporation of New York Application December 29, 1937, Serial No. 182,202

8 Claims. (Cl. 260—36)

This invention relates to plasticizers or softeners, and to plastic compositions containing them. More particularly, the compositions of this invention contain polyvinyl partial acetal resins plasticized with certain high molecular weight esters and polyether-alcohols. They possess unusual properties of strength and resiliency coupled with great toughness.

The new compositions are clear and colorless, and the combination of the resin and plasticizer is so nearly permanent that these compositions are extremely valuable where lasting qualities of strength and flexibility over a wide range of temperatures are desired. In addition, these compositions will, in general, adhere to smooth surfaces, such as glass, and the tenacity, or degree of adhesion is dependent largely upon the particular plasticizer incorporated with the resin. In general, these compositions are well suited as reinforcing materials for such articles as laminated non-shattering glass, where high strength, extreme clarity and permanent resiliency are of great importance.

Polyvinyl partial acetal resins may be prepared, for example, by the incomplete condensation of aldehydes with polyvinyl alcohol (obtainable by the saponification or hydrolysis of polyvinyl esters), and they contain in the polymeric aggregate both acetal groups and free alcoholic hydroxyl groups, and substantially no others. The degree to which the hydroxyl groups of the polyvinyl macromolecule have been combined with aldehyde may be indicated directly, and will be referred to herein as percent acetalization. Various methods have been proposed for making polyvinyl partial acetal resins, and the mode by which they originate is not essential to this invention.

Not all polyvinyl partial acetal resins possess the properties necessary to provide satisfactory plasticized compositions for the reinforcement of laminated non-shattering glass, or like uses, where the shock-absorbing material must be capable of extreme elongation, coupled with great strength and toughness, while also having unusual clarity and, preferably, natural adhesion to smooth surfaces. To obtain such polyvinyl partial acetal resins it is necessary to use in their preparation a polyvinyl compound of high molecular weight, such as polyvinyl alcohol or an ester thereof having a molecular weight in excess of about 10,000, and resins prepared from polyvinyl acetate having an average molecular weight of at least 25,000 are preferred. (Molecular weights referred to herein are calculated by means of Staudinger's formula from viscosity determinations on solutions of the materials.) The suitability of a given resin of this type is determined by two additional factors, the more important of which is the degree of acetalization and of nearly equal importance is the nature of the aldehyde from which it is made. In general, the resins capable of producing satisfactory reinforcement layers for safety glass are acetalized between about 33% and about 94%, and the aldehydes from which they are made are those of the aliphatic series containing from 2 to 6 carbon atoms inclusive. The more desirable resins are made from aldehydes of saturated straight chain structure, and, of the aldehydes of this type, butyraldehyde, propionaldehyde and valeraldehyde are preferred in the order given. The degrees of acetalization which yield the most desirable plastics for use in laminated glass are from about 88% to about 94% with acetaldehyde; from about 52% to about 92% with propionaldehyde; from about 42% to about 82% with butyraldehyde; from about 35% to about 62% with valeraldehyde; and from about 33% to about 45% with hexaldehyde.

In the accompanying drawing the particular class of resins which are capable of producing plasticized compositions of remarkable strength, resiliency and clarity and which may also exhibit a natural adhesion to smooth surfaces, depending upon the plasticizer employed, are graphically differentiated from all other polyvinyl partial and complete acetal resins which will not yield plasticized compositions having all of these unusual physical properties regardless of the plasticizer employed.

Referring to the drawing, the isothermal curves show how the softening temperature of the polyvinyl acetal resin changes with degree and kind of acetalization. Within the field of composition represented by this chart the area enclosed by the curve A indicates approximately the range of desirable resin composition. Thus, a resin which has a chemical composition falling within the curve A will yield a plasticized material having adequately low water absorption, remarkable strength and extensibility, extreme clarity, and natural adhesion to smooth surfaces when combined with a suitable plasticizer. On the other hand, a resin whose chemical composition falls outside of curve A lacks the requisite characteristics for forming plasticized compositions having the above-described extraordinary physical properties regardless of the plasticizer employed.

It is pointed out that the abscissa of this chart, which indicates the kind of aldehyde, refers to resins acetalized with (1) a single aldehyde, as would be indicated by the five ordinates designated by the names of the five aldehydes; and (2) resins acetalized with two aldehydes adjacent on the chart, the total amount of acetalization being indicated on the ordinate and the proportion of the two aldehydes being indicated as proportional to the distance between the adjacent aldehydes on the chart. For example, a resin having the composition (X) on the drawing would consist of polyvinyl alcohol 65% acetalized with butyraldehyde, and a resin having the composition (Y) on the drawing would consist of polyvinyl alcohol 90% acetalized with a mixture of half valeraldehyde and half hexaldehyde (45% acetalized with each).

The preparation and properties of these resins form the subject-matter of my Patents 2,162,-678, 2,162,679, and 2,162,680 issued June 13, 1939.

The most outstanding characteristic of the resins included within curve A (which may have, when plasticized, ultimate tensile strengths of more than 2000 pounds per square inch with an elongation of over 200%), is their virtual insolubility in the plasticizer at ordinary temperatures, coupled with the capacity of the resins themselves to absorb sufficient quantities of the plasticizer to give adequately softened compositions. Therefore, in order to qualify as a successful plasticizer for polyvinyl partial acetal resins to make the compositions of this invention, the plasticizer must be soluble (or absorbable or dispersible) in the resin, but the resin must not dissolve in the plasticizer, at ordinary temperatures. At elevated temperatures, it is preferable that the resin and plasticizer should be at least partly miscible, or the resin soluble in the plasticizer, so that on cooling, resin saturated with the plasticizer will separate out. This is illustrated by the fact that if 95 parts of a plasticizer, such as triethylene glycol dibutyrate, are combined with 5 parts of a polyvinyl partial butyraldehyde acetal resin about 67% acetalized, a homogeneous solution will result at elevated temperatures. If this mixture is then cooled at room temperature, the resin saturated with plasticizer, as a soft solid mass, separates out from the excess liquid plasticizer.

If, however, the amount of resin in the composition is increased so that 60 parts of resin are combined with 40 parts of plasticizer, a bright, homogeneous mass results which does not separate upon cooling. It is believed that this phenomenon is due to the fact that the plasticizer dissolves in the resin even though it is not a solvent for the resin. Such an explanation seems probable since more than 30 parts of a plasticizer, such as the ethyl ether of triethylene glycol benzoate, may be added to about 70 parts of the above butyraldehyde resin with little tendency of the particles of resin to coalesce even on standing for several hours at temperatures below 65° F. In other words, it appears that in such plasticized compositions the resin exists in the continuous phase and the plasticizer as the dispersed phase. However, this is only one possible explanation of the facts observed, and the invention is not to be limited by any theories advanced herein.

Many plasticizers which are used commercially for softening other resins are wholly unsuitable for making the compositions of this invention for the reason that at ordinary temperatures they will dissolve appreciable amounts of resins of any chemical compositions lying within the curve A of the drawing, and many other plasticizers are equally unsuitable in that they will not be absorbed sufficiently by any of the resins to render the resulting compositions sufficiently pliable. Between these two extremes there are certain esters and polyether-alcohols which will not dissolve resins whose chemical compositions lie within curve A, but are absorbed by (or dispersed in) the resins sufficiently to make plasticized materials of the extraordinary physical properties which are characteristic of the products of this invention. However, within this select group of plasticizers there are very few which are capable of forming equally satisfactory compositions with all of the resins within curve A, for the reason that the properties of solubility and compatibility of the resins with regard to the plasticizers change with degree and kind of acetalization.

The essence of this invention lies in the discovery of a certain group of plasticizers which, although not superior in combination with all resins within curve A, form exceptionally strong and resilient compositions with those resins which fall within a narrower range of acetalization. This narrower range is represented on the chart as the shaded portion of the area enclosed by curve A; and for the five aldehydes indicated, the percentage acetalization of the polyvinyl alcohol is approximately: from 88% to 92% with acetaldehyde; 65% to 82% with propionaldehyde; 55% to 72% with butyraldehyde; 43% to 55% with valeraldehyde; and 35% to 40% with hexaldehyde.

The plasticizers which are suitable for making the compositions of this invention are certain high molecular weight liquids, which are compatible with the polyvinyl partial acetal resins described, and the liquids which may be used as the plasticizers in this invention include the following aromatic and aliphatic esters and aliphatic polyether-alcohols:

Triethylene glycol di(butyryl-lactate)
Triethylene glycol dibutyrate
1 to 4 carbon atom alkyl ethers of triethylene glycol benzoate (particularly the methyl, ethyl and butyl ethers)
Ethyl ether of pentaethylene glycol acetate
Cyclohexyl ether of ethylene glycol acetate
Di(ethoxy ethyl) adipate
Di(methoxy ethyl) adipate
Di(methoxy ethyl) succinate
Dioctyl phthalate
Dioctyl maleate
Tricresyl thiophosphate
Dibutyl tartrate
Dioctyl tartrate
Glyceryl diacetate
Methyl ether of tetraethylene glycol
Ethyl ether of tetraethylene glycol Although all of the compounds, when combined with the resins described, form plasticized compositions having great strength and extensibility, the polyether alcohols and hydroxy esters tend to inhibit the natural adhesiveness of the resin, so that these latter compounds should be used only where great adhesion to smooth surfaces is not paramount in the plasticized compositions.

The new compositions may be made by combining the plasticizer with the polyvinyl partial acetal resin in a number of ways. In general, it is necessary to assist the combination of plasticizer and resin by employing such physical aids as heat, pressure, mechanical working, mutual solvents that form no part of the actual plasticized material and which may be subsequently eliminated, and combinations of these.

Plastic compositions for use in laminated non-shattering glass must be elastic and strong over a considerable range of temperature, for example, from about −10° to about 120° F. Experiments conducted to determine the merits of the above plasticizers in such compositions showed that the esters of glycols and glycol ethers with the various aliphatic and aromatic acids were the most desirable. The test employed in these determinations was conducted by dropping a ½ pound steel ball from various heights on a laminated glass sheet 6 inches square, containing the plasticized resin, and maintained at a constant temperature of about 75° F. Failure of the samples was considered to occur when the steel ball perforated the glass square or when the square was broken in two or more pieces, and this was recorded as the height in feet from which the ball was dropped. It was found that sheets 0.30 inch thick made of polyvinyl partial acetal resins of a chemical composition lying within the shaded area of curve A, in combination with common plasticizers, such as diethyl phthalate, failed in laminated glass samples at heights no greater than 24 feet. Resins containing a lower quantity of hydroxyl groups (higher percent acetalization), in combination with such plasticizers, failed at even lower heights. Such plasticizers as triethylene glycol dibutyrate that do not dissolve the resin at ordinary temperatures, in combination with the preferred polyvinyl partial acetal resins, have formed interlayers for laminated glass which prevented failure of the sample at heights as great as 80 feet. High-boiling, nonsolvent softeners of this nature remain combined with the resins over a wide range of temperature both above and below the test temperature. Because they are not lost by evaporation, they do not form bubbles between the resin and glass at temperatures as high as 150° F.

The compositions of this invention may be varied considerably both as to the type of polyvinyl partial acetal resin employed and the amount and nature of plasticizer used. The quantity of plasticizer incorporated in the resin may be varied from very small quantities up to the largest amount that will form a homogeneous composition, or, in other words, be compatible with the resin. The actual amount is determined by the physical characteristics desired of the plasticized composition, for the greater the quantity of plasticizer there is in the composition the softer and more flexible it becomes. Usually, however, the best compositions are obtained by the incorporation of about 25% to about 65% plasticizer, with about 30% plasticizer being preferred. In addition, more than one plasticizer may be incorporated in the same resin, provided the plasticizers themselves are miscible in the proportions to be used.

The usefulness of the new compositions is not confined to laminated non-shattering glass, but they may be employed generally where tough and resilient plastic materials are required.

Other modifications will be apparent and such modifications are included within the invention as defined by the appended claims.

I claim:

1. Plastic composition essentially composed of a polyvinyl partial acetal resin combined with a plasticizer; said resin being substantially identical with a resin resulting from the condensation of polyvinyl alcohol derived from a polyvinyl ester of average macromolecular weight in excess of about 10,000, preferably in excess of 25,000, with aldehyde sufficient to combine with from about 33% to about 94% of the hydroxyl groups of said polyvinyl alcohol, said aldehyde comprising at least one saturated aliphatic aldehyde having from two to six carbon atoms in its molecule, and in which the aldehyde and the degree of condensation are so correlated as to produce a resin substantially insoluble in said plasticizer at ordinary temperatures but which is compatible with substantial quantities of said plasticizer to yield, when combined therewith, homogeneous compositions having an elongation in excess of about 200% and an ultimate tensile strength above about 2,000 pounds per square inch at ordinary temperatures; said plasticizer being chosen from the group consisting of triethylene glycol dibutyrate and di(butyryl-lactate), 1 to 4 carbon alkyl ethers of triethylene glycol benzoate, ethyl ether of pentaethylene glycol acetate, cyclohexyl ether of ethylene glycol acetate, di(methoxy ethyl) adipate and succinate, di(ethoxy ethyl) adipate, dioctyl phthalate and maleate, tricresyl thiophosphate, dibutyl and dioctyl tartrate, glyceryl diacetate, methyl and ethyl ethers of tetraethylene glycol.

2. Plastic composition essentially composed of a polyvinyl partial acetal resin substantially identical with a resin consisting of polyvinyl alcohol acetalized with an aldehyde from the group consisting of acetaldehyde between about 88% and about 92%, propionaldehyde between about 65% and about 82%, butyraldehyde between about 55% and about 72%, valeraldehyde between about 43% and about 55%, and hexaldehyde between about 35% and about 40%; said polyvinyl partial acetal resin being combined with a compound chosen from the group consisting of triethylene glycol dibutyrate and di(butyryl-lactate), 1 to 4 carbon atom alkyl ethers of triethylene glycol benzoate, ethyl ether of pentaethylene glycol acetate, cyclohexyl ether of ethylene glycol acetate, di(methoxy ethyl) adipate and succinate, di(ethoxy ethyl) adipate, dioctyl phthalate and maleate, tricresyl thiophosphate, dibutyl and dioctyl tartrate, glyceryl diacetate, methyl and ethyl ethers of tetraethylene glycol.

3. Plastic composition essentially composed of a polyvinyl partial acetal resin acetalized between about 65% and about 82% with propionaldehyde; said polyvinyl partial acetal resin being combined with a compound chosen from the group consisting of triethylene glycol dibutyrate and di(butyryl-lactate), 1 to 4 carbon atom alkyl ethers of triethylene glycol benzoate, ethyl ether of pentaethylene glycol acetate, cyclohexyl ether of ethylene glycol acetate, di(methoxy ethyl) adipate and succinate, di(ethoxy ethyl) adipate, dioctyl phthalate and maleate, tricresyl thiophosphate, dibutyl and dioctyl tartrate, glyceryl diacetate, methyl and ethyl ethers of tetraethylene glycol.

4. Plastic composition essentially composed of a polyvinyl partial acetal resin acetalized between about 55% and about 72% with butyraldehyde; said polyvinyl partial acetal resin being combined with a compound chosen from the group consisting of triethylene glycol dibutyrate and di(butyryl-lactate), 1 to 4 carbon atom alkyl ethers of triethylene glycol benzoate, ethyl ether of pentaethylene glycol acetate, cyclohexyl ether of ethylene glycol acetate, di(methoxy ethyl) adipate and succinate, di(ethoxy ethyl) adipate, dioctyl phthalate and maleate, tricresyl thiophosphate, dibutyl and dioctyl tartrate, glyceryl diacetate, methyl and ethyl ethers of tetraethylene glycol.

5. Plastic composition essentially composed of a polyvinyl partial acetal resin acetalized between about 43% and about 55% with valeraldehyde; said polyvinyl partial acetal resin being combined with a compound chosen from the group consisting of triethylene glycol dibutyrate and di(butyryl-lactate), 1 to 4 carbon atom alkyl ethers of triethylene glycol benzoate, ethyl ether of pentaethylene glycol acetate, cyclohexyl ether of ethylene glycol acetate, di(methoxy ethyl) adipate and succinate, di(ethoxy ethyl) adipate, dioctyl phthalate and maleate, tricresyl thiophosphate, dibutyl and dioctyl tartrate, glyceryl diacetate, methyl and ethyl ethers of tetraethylene glycol.

6. Plastic composition essentially composed of a polyvinyl partial acetal resin substantially identical with a resin consisting of polyvinyl alcohol acetalized with an aldehyde from the group consisting of acetaldehyde between about 88% and about 92%, propionaldehyde between about 65% and about 82%, butyraldehyde between about 55% and about 72%, valeraldehyde between about 43% and about 55%, and hexaldehyde between about 35% and about 40%; said polyvinyl partial acetal resin being combined with the ethyl ether of pentaethylene glycol acetate to yield a composition having great strength and toughness.

7. Plastic composition essentially composed of a polyvinyl partial acetal resin substantially identical with a resin consisting of polyvinyl alcohol acetalized with an aldehyde from the group consisting of acetaldehyde between about 88% and about 92%, propionaldehyde between about 65% and about 82%, butyraldehyde between about 55% and about 72%, valeraldehyde between about 43% and about 55%, and hexaldehyde between about 35% and about 40%; said polyvinyl partial acetal resin being combined with triethylene glycol dibutyrate to yield a composition having great strength and toughness.

8. Plastic composition essentially composed of a polyvinyl partial acetal resin substantially identical with a resin consisting of polyvinyl alcohol acetalized with an aldehyde from the group consisting of acetaldehyde between about 88% and about 92%, propionaldehyde between about 65% and about 82%, butyraldehyde between about 55% and about 72%, valeraldehyde between about 43% and about 55%, and hexaldehyde between about 35% and about 40%; said polyvinyl partial acetal resin being combined with di(ethoxy ethyl) adipate to yield a composition having great strength and toughness.

HAROLD F. ROBERTSON.